(12) United States Patent
Hashiguchi

(10) Patent No.: US 9,350,953 B2
(45) Date of Patent: *May 24, 2016

(54) OPTICAL TRANSMISSION SYSTEM

(71) Applicant: Nihon Video System Co., Ltd., Tsushima-shi, Aichi (JP)

(72) Inventor: Kentaro Hashiguchi, Tsushima (JP)

(73) Assignee: Nihon Video System Co., Ltd., Tsushima-shi (JP)

( * ) Notice: Subject to any disclaimer, the term of this patent is extended or adjusted under 35 U.S.C. 154(b) by 337 days.

This patent is subject to a terminal disclaimer.

(21) Appl. No.: 13/951,297

(22) Filed: Jul. 25, 2013

(65) Prior Publication Data

US 2014/0049637 A1 Feb. 20, 2014

(30) Foreign Application Priority Data

Jul. 30, 2012 (JP) .................................. 2012-168756

(51) Int. Cl.
*H04N 7/18* (2006.01)
*H04N 7/22* (2006.01)
*H04N 5/232* (2006.01)

(52) U.S. Cl.
CPC . *H04N 7/18* (2013.01); *H04N 7/22* (2013.01); *H04N 5/23206* (2013.01)

(58) Field of Classification Search
CPC ........ H04N 5/23206; H04N 7/18; H04N 7/22
USPC ..................... 348/143, 333.01, 359, 723, 725; 398/135, 138, 139

See application file for complete search history.

(56) References Cited

U.S. PATENT DOCUMENTS 5,652,849 A * 7/1997 Conway ................. G08B 25/14
            348/115
6,115,159 A * 9/2000 Baker ................ H04N 5/23203
            348/143

(Continued)

FOREIGN PATENT DOCUMENTS

| JP | 2009-89114 A | 4/2009 |
| JP | 2011-223541 A | 11/2011 |
| KR | 10-2011-0086511 A | 7/2011 |

OTHER PUBLICATIONS

Korean Office Action mailed Jun. 25, 2014, issued in Korean Application No. 10-2013-0089243, filed Jul. 27, 2013, 3 pages.

*Primary Examiner* — Thai Tran
*Assistant Examiner* — Stephen Smith
(74) *Attorney, Agent, or Firm* — Christensen O'Connor Johnson Kindness PLLC

(57) ABSTRACT

The present invention provides an optical transmission system that optically transmits an optical signal between a camera adaptor provided to a video camera and a base station provided at a position remote from the video camera. In the optical transmission system, the camera adaptor includes a control signal input unit that receives a control signal including a return signal component, a video selecting unit that outputs, to the exterior, the camera video signal component of the first electric signal of the return video signal component of the second electric signal based on a state of the return signal component, and a control signal separating unit that outputs the control signal other than the return signal component.

1 Claim, 3 Drawing Sheets

(56) References Cited

U.S. PATENT DOCUMENTS

| | | | |
|---|---|---|---|
| 6,947,069 B1 * | 9/2005 | Elberbaum | H04N 7/22 348/50 |
| 7,327,959 B2 * | 2/2008 | Pelletier | H04B 10/40 348/373 |
| 9,019,386 B2 * | 4/2015 | Ganahl | H04N 5/23206 348/159 |
| 2010/0007750 A1 * | 1/2010 | Lundberg | G08B 13/19656 348/211.3 |
| 2011/0181766 A1 * | 7/2011 | Hashiguchi | H04N 5/222 348/333.12 |

* cited by examiner

OPTICAL TRANSMISSION SYSTEM

TECHNICAL FIELD

The present invention relates to an optical transmission system that transmits an optical signal between a camera adaptor provided to a video camera and a base station provided at a position remote from the video camera.

BACKGROUND ART

A video signal of video captured by a video camera is transmitted to a switcher via a transmission cable. Because it is difficult to transmit an electric signal without attenuation when the devices are positioned remote from the video camera, a camera adaptor provided to the video camera converts the electric signal into an optical signal, and transmits the converted optical signal via an optical transmission cable. Then, a base station provided to the remotely-located device converts the optical signal into the electric signal. As above, long distance transmission is conducted. The long distance transmission is usually bidirectional, and signals of video (hereinafter referred to as "return video") employed by the switcher are optically transmitted from the base station side to the camera adaptor.

A broadcast video camera in general receives a return video signal from the switcher and has a function to switch video display of the view finder between currently captured video (hereinafter referred to as "camera video") and the return video from the switcher when the operator of the camera presses a return button of the lens mounted on the video camera or presses a return button of a zoom remote controller attached to the lens mounted on the video camera.

Recently, video camera performance has been improved, and therefore this has made it possible to capture video of quality high enough for broadcasting by using a less expensive video camera without using a very expensive video camera designed for broadcast use. Although the less expensive camera is capable of providing high quality video, the camera fails to receive the return video by a main body thereof because the camera is not designed with consideration of broadcast use. Thus, it has not been possible to use the less expensive video camera for broadcasting even though the video camera provides sufficient quality video.

Under the above circumstance, Patent Document 1 discloses a view finder capable of switching between the camera video and the return video, as a view finder capable of employing a less expensive video camera for broadcasting.

PRIOR ART REFERENCE

Patent Document

Patent Document 1: JP-A-2011-223541

SUMMARY OF THE INVENTION

Problems to be Solved by the Invention

However, the use of the view finder described in Patent Document 1 has a problem that such a special view finder must be purchased in addition to the video camera.

The present invention is made in view with the above situation, and therefore provides an optical transmission system that is capable of switching camera video and return video without using a special view finder.

Means for Solving the Problems

According to the present invention, there is provided an optical transmission system that optically transmits an optical signal between a camera adaptor provided to a video camera and a base station provided at a position remote from the video camera. In the optical transmission system, the camera adaptor converts a first electric signal including a camera video signal component from the video camera into a first optical signal and transmits the first optical signal to the base station. The base station receives the first optical signal, converts the first optical signal into the first electric signal, outputs the first electric signal to an exterior, converts a second electric signal including a return video signal component from a switcher into a second optical signal, and transmits the second optical signal to the camera adaptor. The camera adaptor receives the second optical signal, and converts the second optical signal into the second electric signal. Either of the camera video signal component and the return video signal component is a digital video signal. The camera adaptor includes a control signal input unit that receives a control signal including a return signal component, a video selecting unit that outputs, to the exterior, the camera video signal component of the first electric signal of the return video signal component of the second electric signal based on a state of the return signal component, and a control signal separating unit that outputs the control signal other than the return signal component.

An optical transmission system of the present invention mainly targets a video camera that has a function of switching between the camera video and video (hereinafter referred to as "just-recorded video"), which has been captured several seconds ago and saved in the camera main body, by using a remote controller. Such a video camera switches the camera video and the just-recorded video based on a return signal component from the remote controller. The output from the remote controller usually includes a signal component for zoom adjustment and a signal component for start/stop of recording in addition to the return signal component. These signal components are all referred to as a "control signal".

In the present invention, a control signal outputted from the remote controller and including the return signal component is not inputted into a video camera. Instead, the control signal is inputted into a camera adaptor of the present invention. The camera adaptor of the present invention has a video selecting unit, and the video selecting unit receives a camera video signal component and a return video signal component. The video selecting unit outputs the camera video signal component or the return video signal component to an exterior based on the return signal component from the remote controller. Due to the above configuration, it is possible to switch between the camera video and the return video by using the remote controller, and thereby making it possible to use a less expensive video camera incapable of receiving the return video by the camera main body, for television broadcasting. Also, a view finder having a special configuration disclosed in Patent Document 1 is not required.

Although the above configuration enables the switching between the camera video and the return video, there is one problem. Because the control signal outputted by the remote controller is inputted into a video device of the camera adaptor of the present invention instead of being inputted into the video camera, components of the control signal other than the return signal component are also inputted into the camera adaptor of the present invention. As a result, it is impossible to conduct the zoom adjustment and the start/stop of the recording by using the remote controller disadvantageously. In the present invention, in order to solve the problem, the system is configured such that the components of the control signal other than the return signal component are outputted from the camera adaptor of the present invention, and the outputted components are inputted into the video camera. Due to the above configuration, the components of the control signal other than the return signal component are normally inputted into the video camera, and the above problem is solved. The return signal component is eliminated from the control output from the camera adaptor of the present invention because if the return signal component is inputted into the video camera, video camera disadvantageously stops recording the camera video and outputs the just-recorded video when the return video is to be checked. Due to the above, use of an optical transmission system having the camera adaptor of the present invention enables the use of a less expensive video camera conventionally incapable of being used for broadcasting, for broadcasting.

A first optical signal from the video camera side preferably has a transmission wavelength different from that of a second optical signal from the switcher side. In the above case, even when the same optical transmission cable is used for transmission of the both signals, the signals are not interfering with each other.

EMBODIMENT FOR CARRYING OUT THE INVENTION

1. First Embodiment
1-1. Configuration of Optical Transmission System

Figure 1:
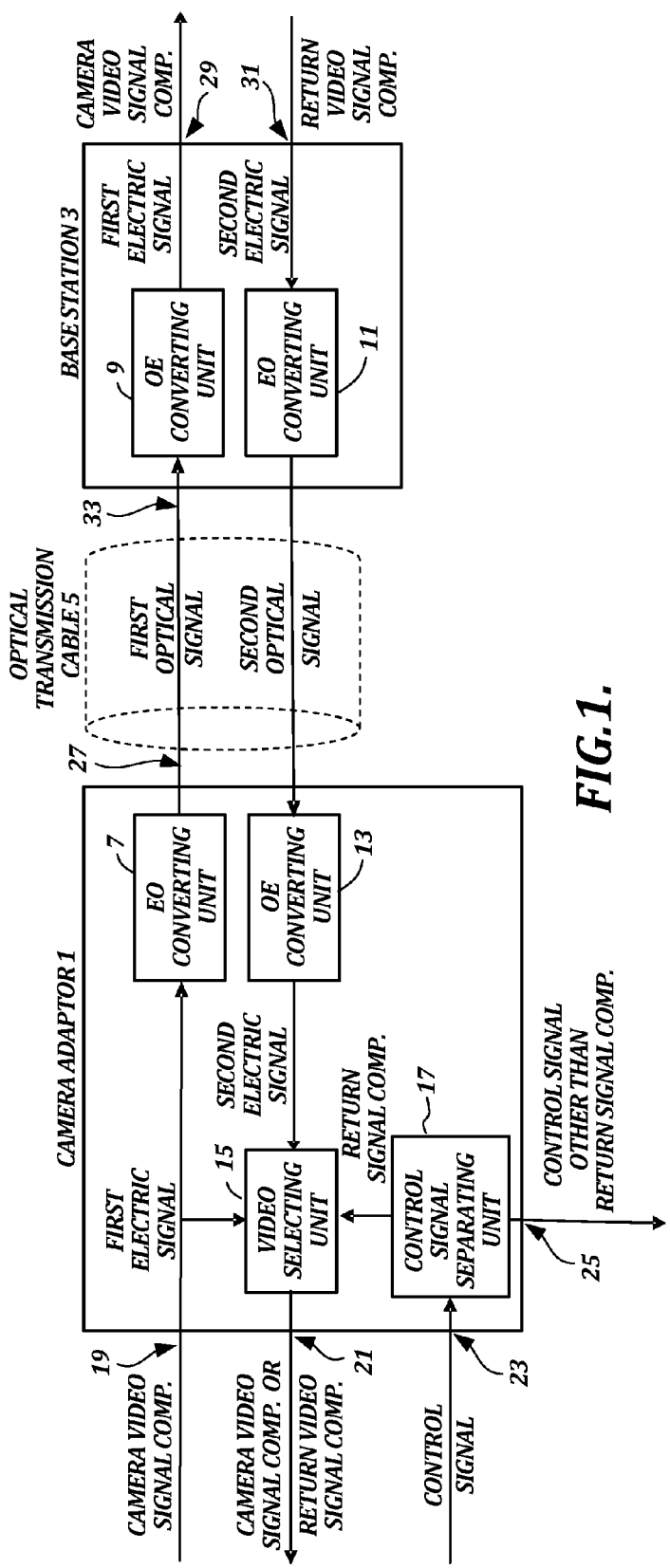
FIG. 1 is a block diagram illustrating an optical transmission system according to the first embodiment of the present invention.

An optical transmission system according to the first embodiment of the present invention will be described below with reference to FIG. 1. The optical transmission system of the present embodiment optically transmits an optical signal between a camera adaptor 1 provided to a video camera and a base station 3 provided at a position remote from the video camera. In the optical transmission system, the camera adaptor 1 converts a first electric signal including a camera video signal component from the video camera into a first optical signal and transmits the first optical signal to the base station 3. The base station 3 receives the first optical signal, converts the first optical signal into a first electric signal, and outputs the first electric signal to an exterior. Also, the base station 3 converts a second electric signal including a return video signal component from a switcher into a second optical signal, and transmits the second optical signal to the camera adaptor 1. The camera adaptor 1 receives the second optical signal, and converts the second optical signal into the second electric signal. Each of the camera video signal component and the return video signal component is a digital video signal. The camera adaptor 1 includes a control signal separating unit 17 and a video selecting unit 15. The control signal separating unit 17 receives a control signal including a return signal component and outputs components of the control signal other than the return signal component. The video selecting unit 15 outputs, to the exterior, the camera video signal component of the first electric signal or the return video signal component of the second electric signal based on a return signal component of the control signal. Each component will be described below.

1-2. Camera Adaptor 1

A camera adaptor 1 has a camera video signal input terminal 19, a selected video signal output terminal 21, a control signal input terminal 23, a control signal output terminal 25, and a connection terminal 27 for an optical transmission cable 5.

Figure 2:
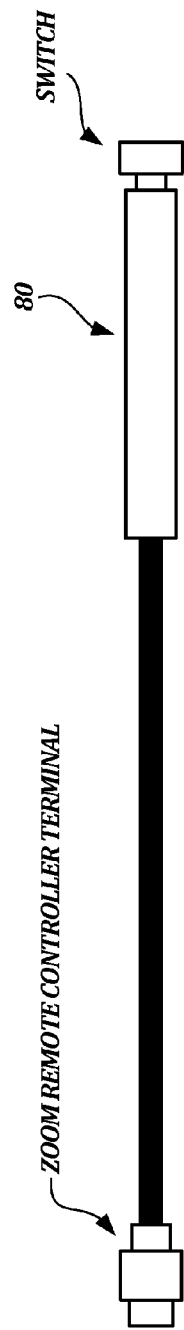
FIG. 2 illustrates a pen-type return switch device usable in the optical transmission system according to the first embodiment of the present invention.

The camera video signal input terminal 19 is connected with a cable connected with a video signal output terminal of the video camera. The selected video signal output terminal 21 is connected with a cable connected with a video signal input terminal of the video display device (such as, a view finder of the video camera). The control signal input terminal 23 is connected with a remote controller that outputs a control signal including a return signal component. Examples of the remote controller include a remote controller that outputs a signal component for zoom adjustment and a signal component for start/stop of the recording, in addition to the return signal component. Also, another example of the remote controller is a pen-type switch remote controller 80 (shown in FIG. 2) that only outputs the return signal component. The control signal output terminal 25 is connected with a cable connected with a remote controller connection terminal mounted on the video camera or on a lens. The connection terminal for the optical transmission cable 5 is connected with the optical transmission cable 5 that connects the camera adaptor 1 with a base station 3.

1-3. Base Station 3

The base station 3 is provided with a camera video signal output terminal 29, a return video signal input terminal 31, and a connection terminal 33 for the optical transmission cable 5.

The camera video signal output terminal 29 is connected with a cable connected with a video signal input terminal of an external device (such as, a switcher, a relay device). The return video signal input terminal 31 is connected with a cable connected with a return video signal output terminal of the switcher. The connection terminal 33 for the optical transmission cable 5 is connected with the optical transmission cable 5 that connects the camera adaptor 1 with the base station 3.

1-4. Operation of Optical Transmission System

Firstly, the camera adaptor 1 receives the camera video signal component of the video camera. The camera video signal component itself serves as the first electric signal, and the first electric signal is converted into the first optical signal by an EO converting unit 7 of the camera adaptor 1. The first optical signal is transmitted to the base station 3 through the optical transmission cable 5. The camera video signal component is a digital signal (such as, an SDI signal (e.g., an HD-SDI signal, an SD-SDI, a 3G-SDI signal), an HDMI signal, a 3D).

In the base station 3, an OE converting unit 9 receives the first optical signal and converts the optical signal to the first electric signal. Then, the OE converting unit 9 outputs the electric signal, as the camera video signal component, to the external device, such as a switcher, a relay device.

Also, the base station 3 receives the return video signal component from the switcher. The return video signal component is a digital signal (such as, an SDI signal (e.g., an HD-SDI signal, an SD-SDI, a 3G-SDI signal), an HDMI signal, a 3D). The return video signal component itself serves as the second electric signal, and the second electric signal is converted into the second optical signal by an EO converting unit 11, and is transmitted to the camera adaptor 1. The second optical signal may be transmitted through an optical fiber other than the optical fiber used for the first optical signal. Alternatively, the second optical signal may be multiplexed and transmitted through the same optical fiber used for the first optical signal. The multiplexing may employ various multiplex systems, such as wavelength-division multiplexing, frequency division multiplexing, time division multiplexing, code division multiplexing.

Figure 3:
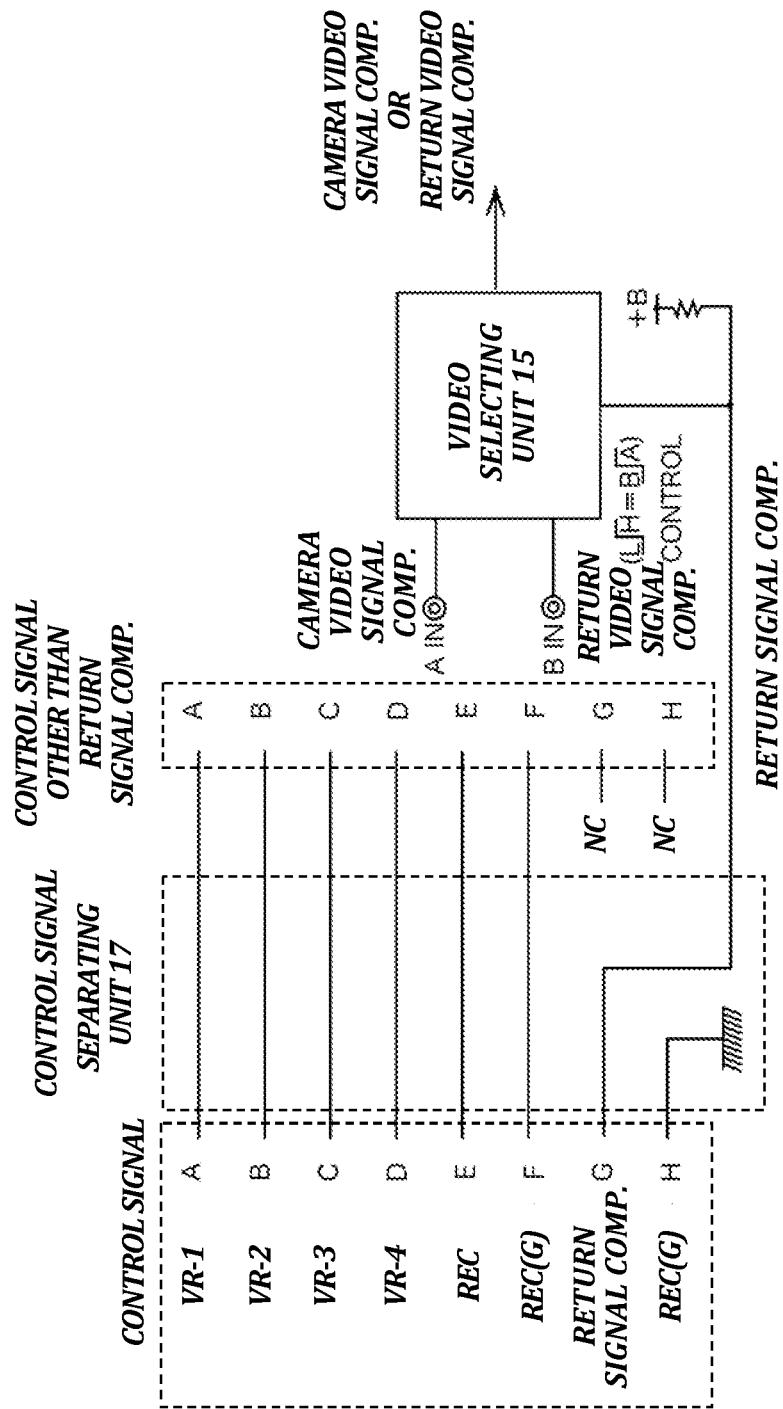
FIG. 3 illustrates one example of a circuit configuration of a control signal separating unit and a video selecting unit according to the first embodiment of the present invention.

In the camera adaptor 1, the OE converting unit 13 receives the second optical signal and converts the optical signal into the second electric signal. The control signal separating unit 17 receives the control signal including the return signal component, and outputs the components of the control signal other than the return signal component. The video selecting unit 15 outputs, to an exterior, the camera video signal component of the first electric signal or the return video signal component of the second electric signal based on the state of the return signal component of the control signal. An example of a circuit configuration of the control signal separating unit 17 and the video selecting unit 15 is illustrated in FIG. 3. The video selecting unit 15, for example, outputs the camera video signal component when the return signal indicates H (high), and outputs the return video signal component when the return signal indicates L (low). The components of the control signal other than the return signal component may be the signal component for zoom adjustment and the signal component for operating the start/stop of the recording. The above signal components are inputted into the video camera, and used for controlling the zoom adjustment and the start/stop of the recording.

Due to the above configuration, without using the view finder of a special configuration, it is possible to use a less expensive video camera having no input terminal for the return video, for broadcasting.

2. Second Embodiment

Figure 4:
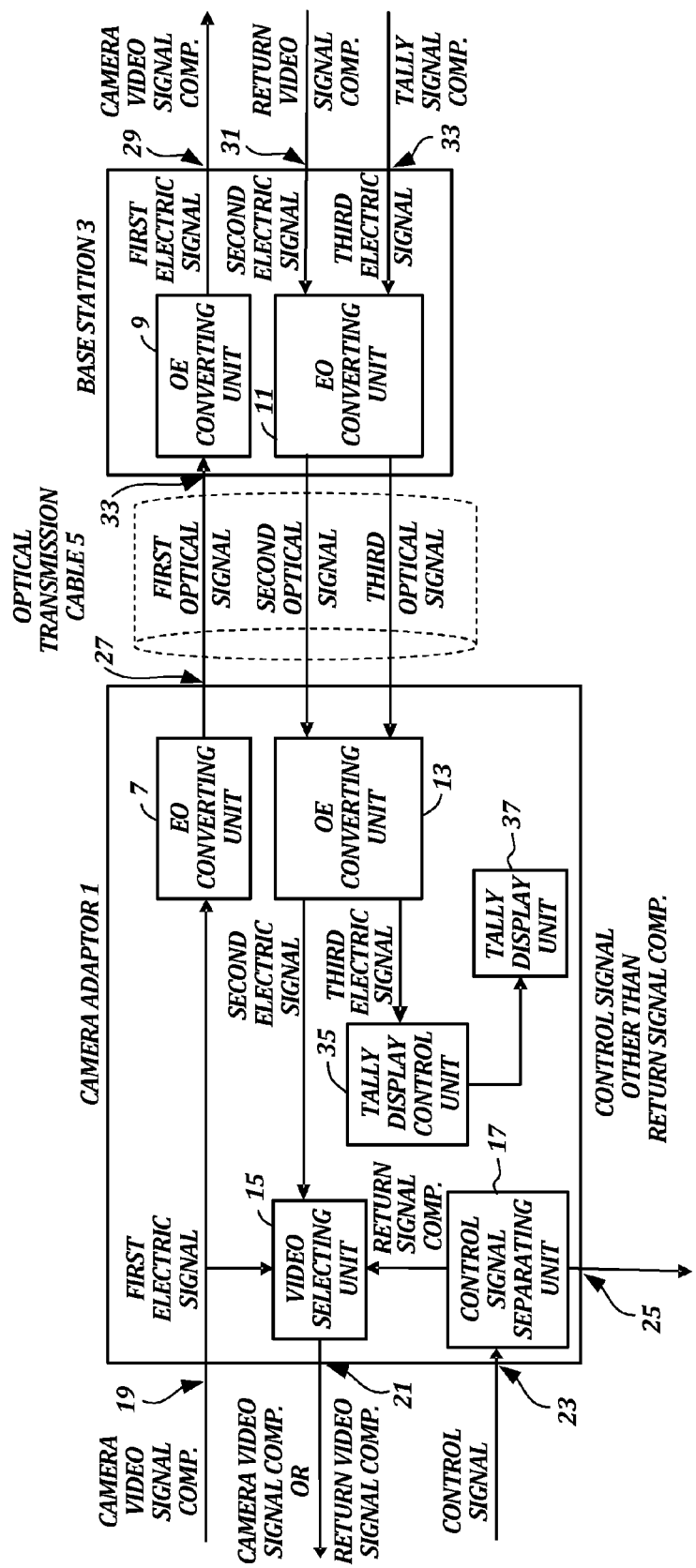
FIG. 4 is a block diagram illustrating an optical transmission system according to the second embodiment of the present invention.

An optical transmission system according to the second embodiment of the present invention will be described below with reference to FIG. 4. In the optical transmission system of the present embodiment, the base station 3 is provided with a tally signal input terminal 33, and a tally signal component is inputted to the base station 3 through the terminal 33. A third electric signal made of the tally signal component is converted into a third optical signal by the EO converting unit 11, and the third optical signal is transmitted to the camera adaptor 1 through the optical transmission cable 5. In the camera adaptor 1, the OE converting unit 13 converts the third optical signal into the third electric signal, and a tally display control unit 35 controls tally display of a tally display unit 37 based on the third electric signal made of the tally signal component. The tally display control unit 35 preferably determines emitting colors of the tally display unit 37 based on the voltage of the tally signal component. Due to the above configuration, even when the emitting color of the tally display unit 37 needs to be changed, only a single signal line for the tally signal component is required. For example, it is possible to light the tally display unit 37 in green when the voltage of the tally signal component is 2 to 4 V, and to light the tally display unit 37 in red when the voltage of the tally signal component is equal to or greater than 5 V. In general, the tally display in green indicates that the switcher is going to use the video of the video camera having the camera adaptor 1 mounted thereon, and the tally display in red indicates that the switcher is currently using the video of the video camera having the camera adaptor 1 mounted thereon.

Because the camera adaptor 1 is normally mounted on a back of the video camera, the attachment of the tally display unit 37 on the camera adaptor 1 enables the camera operator to easily grasp the state of the tally.

The first to third optical signals may be respectively transmitted through different optical fibers, or may be multiplexed and transmitted through the same optical fiber. The multiplexing may employ various multiplex systems, such as wavelength-division multiplexing, frequency division multiplexing, time division multiplexing, code division multiplexing. Also, after the second to third electric signals are combined to produce a single electric signal, the electric signal is converted into an optical signal and the optical signal is transmitted. In a case, where the electric signal is an SDI signal with an ANC region (e.g., an HD-SDI signal, an SD-SDI, a 3G-SDI signal), it is possible to embed the tally signal component in the ANC region of the SDI signal.

The invention claimed is:

1. An optical transmission system comprising:
a camera adaptor provided to a video camera; and
a base station provided at a position remote from the video camera, wherein:
an optical signal is optically transmitted between the camera adaptor and the base station;
the camera adaptor converts a first electric signal including a camera video signal component from the video camera into a first optical signal, and transmits the first optical signal to the base station;
the base station receives the first optical signal, converts the first optical signal into the first electric signal, and outputs the first electric signal to an exterior;
the base station converts a second electric signal including a return video signal component from a switcher into a second optical signal, and transmits the second optical signal to the camera adaptor;
the camera adaptor receives the second optical signal and converts the second optical signal into the second electric signal;
either of the camera video signal component and the return video signal component is a digital video signal; and
the camera adaptor includes:
a signal separating unit that receives a control signal including a return signal component, and outputs the control signal other than the return signal component to the video camera; and
a video selecting unit that outputs, to the exterior that does not include the video camera or the base station, one of the camera video signal component of the first electric signal and the return video signal component of the second electric signal based on a state of the return signal component of the control signal.

* * * * *